(12) United States Patent
Cunningham et al.

(10) Patent No.: US 8,752,475 B2
(45) Date of Patent: Jun. 17, 2014

(54) METHOD AND SYSTEM FOR IMPROVING VEHICLE BRAKING

(75) Inventors: Ralph Wayne Cunningham, Milan, MI (US); Ross Dykstra Pursifull, Dearborn, MI (US); Mansour Beshay, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 645 days.

(21) Appl. No.: 12/912,337

(22) Filed: Oct. 26, 2010

(65) Prior Publication Data

US 2012/0096849 A1  Apr. 26, 2012

(51) Int. Cl.
*B60K 6/12* (2006.01)

(52) U.S. Cl.
USPC ............................... 91/376 R; 303/11

(58) Field of Classification Search
USPC ............. 91/376 R; 60/397, 396, 418, 415; 417/364, 407; 303/114.3, 115.1, 115.3, 303/11
See application file for complete search history.

(56) References Cited

U.S. PATENT DOCUMENTS

| | | | |
|---|---|---|---|
| 3,818,702 A * | 6/1974 | Woo | 60/290 |
| 4,019,323 A | 4/1977 | Zuhn | |
| 4,207,035 A * | 6/1980 | Perr et al. | 417/407 |
| 4,211,082 A | 7/1980 | Bristol | |
| 4,291,612 A * | 9/1981 | Day | 91/6 |
| 4,641,619 A | 2/1987 | Okimoto et al. | |
| 4,696,165 A | 9/1987 | Bucher | |
| 5,064,423 A | 11/1991 | Lorenz et al. | |
| 5,429,100 A | 7/1995 | Goto et al. | |
| 5,461,860 A | 10/1995 | Schegk | |
| 5,558,001 A * | 9/1996 | Osaka et al. | 91/376 R |
| 5,611,203 A | 3/1997 | Henderson et al. | |
| 5,707,214 A | 1/1998 | Schmidt | |
| 5,819,538 A | 10/1998 | Lawson, Jr. | |
| 5,961,189 A * | 10/1999 | Lutteke et al. | 303/114.3 |
| 6,328,003 B1 | 12/2001 | Gaertner et al. | |
| 6,415,749 B1 | 7/2002 | Sturman et al. | |
| 6,813,887 B2 | 11/2004 | Sumser et al. | |
| 6,826,910 B1 | 12/2004 | Easton | |
| 6,922,997 B1 | 8/2005 | Larson et al. | |
| 7,017,342 B2 * | 3/2006 | Iimura et al. | 60/410 |
| 7,062,918 B2 | 6/2006 | Walker et al. | |
| 7,076,952 B1 | 7/2006 | Vetrovec | |

(Continued)

FOREIGN PATENT DOCUMENTS

| | | |
|---|---|---|
| EP | 0754843 A2 | 1/1997 |
| EP | 1956213 A1 | 8/2008 |
| GB | 2422872 B | 1/2007 |

OTHER PUBLICATIONS

Vetrovec, John. "Fluid-Dynamic Supercharger." SAE Technical Paper Series. 2008-01-0299. Apr. 14-17, 2008. Detroit, Michigan. 15 pages. SAE International; Warrendale, PA.

Pursifull, Ross Dykstra et al., "Stored Compressed Air Management for Improved Engine Performance," U.S. Appl. No. 12/761,051, filed Apr. 15, 2010, 52 pages.

(Continued)

*Primary Examiner* — Thomas E Lazo

(74) *Attorney, Agent, or Firm* — Julia Voutyras; Alleman Hall McCoy Russell & Tuttle LLP

(57) ABSTRACT

An engine with a positive pressure assisted brake booster is disclosed. In one example, an operator applying vehicle brakes is assisted by positive pressure provided by a compressor coupled to an engine of the vehicle. Operation of the vehicle brakes may be improved especially when engine vacuum is limited.

20 Claims, 4 Drawing Sheets

(56) References Cited

U.S. PATENT DOCUMENTS

| | | | |
|---|---|---|---|
| 7,089,916 B2* | 8/2006 | Abo et al. | 123/490 |
| 7,226,273 B2* | 6/2007 | Doerr et al. | 417/53 |
| 7,251,925 B2 | 8/2007 | Paradise | |
| 7,367,327 B2 | 5/2008 | Piriou et al. | |
| 2002/0014077 A1 | 2/2002 | Long | |
| 2002/0163247 A1* | 11/2002 | Yonemura et al. | 303/113.1 |
| 2004/0200453 A1* | 10/2004 | Abo et al. | 123/299 |
| 2006/0107662 A1 | 5/2006 | Warmstrom et al. | |
| 2006/0168958 A1 | 8/2006 | Vetrovec | |
| 2007/0119169 A1 | 5/2007 | Berger et al. | |
| 2007/0236083 A1* | 10/2007 | Kawamori et al. | 303/114.3 |
| 2008/0133110 A1 | 6/2008 | Vetrovec | |
| 2008/0271447 A1 | 11/2008 | Abel et al. | |

OTHER PUBLICATIONS

Pursifull, Ross Dykstra et al., "Stored Compressed Air Management and Flow Control for Improved Engine Performance," U.S. Appl. No. 12/761,076, filed Apr. 15, 2010, 52 pages.

Pursifull, Ross Dykstra, "Condensate Management for Motor-Vehicle Compressed Air Storage Systems," U.S. Appl. No. 12/761,104, filed Apr. 15, 2010, 52 pages.

Cunningham, Ralph Wayne et al., "Method and System for Controlling Engine Air," U.S. Appl. No. 12/862,067, filed Aug. 24, 2010, 42 pages.

Cunningham, Ralph Wayne et al., "Method and System for Controlling Vacuum," U.S. Appl. No. 121899,370, filed Oct. 6, 2010, 30 pages.

* cited by examiner

METHOD AND SYSTEM FOR IMPROVING VEHICLE BRAKING

BACKGROUND/SUMMARY

Vehicle fuel economy can be improved for some vehicles by lowering the vehicle's engine displacement and by boosting the air supplied to the engine. The air may be boosted via a turbocharger compressor or via a mechanically driven super charger. Engine pumping work can be decreased by reducing engine displacement, and boosting the engine air supply can allow a smaller displacement engine to have performance similar to a larger displacement engine. However, when engine displacement is lowered and intake air pressure boosted, it may be difficult to provide vacuum to assist an operator to apply vehicle brakes. For example, since engine displacement is reduced, a smaller displacement engine may have to operate at higher intake manifold pressures for longer periods of time as compared to larger displacement engines. Consequently, the engine may operate for less time at operating conditions where the engine produces vacuum in the engine intake manifold. As a result, the amount of engine vacuum produced may be less than is desirable to operate vehicle brakes.

The inventors herein have recognized the issues of vacuum assisted brakes in boosted engines and have developed a method for improving brake operation of a vehicle, comprising: generating a positive pressurized air referenced to atmospheric pressure; applying the positive pressurized air to a first chamber of a brake booster; and actuating a vehicle brake via a brake booster diaphragm, the brake booster diaphragm exposed to the first chamber.

By applying a positive pressure to the first chamber of a brake booster it is possible to deflect a diaphragm of the brake booster so that it is possible to assist an operator applying vehicle brakes even though the engine may be operating at conditions where little engine vacuum is available to actuate vehicle brakes. For example, a portion of pressurized air entering an engine via a compressor can be directed to a brake booster to actuate vehicle brakes.

In another example, engine vacuum may be provided to one chamber of a brake booster while a positive pressure is applied to another chamber of the brake booster diaphragm so that the operator may be assisted by vacuum and positive pressure. A diaphragm between the first and second chambers may deflect in response to a pressure differential across the diaphragm. In these ways, it is possible to assist an operator applying brakes of a downsized boosted engine.

The present description may provide several advantages. In particular, the approach may enhance vehicle brake assistance by augmenting vacuum assistance with positive pressure assistance. Further, the approach may provide improved brake actuator assistance during engine operating conditions when brake actuator assistance may otherwise be reduced. Further still, the approach may be useful to reduce brake booster size since more force may be applied to the brake booster diaphragm.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
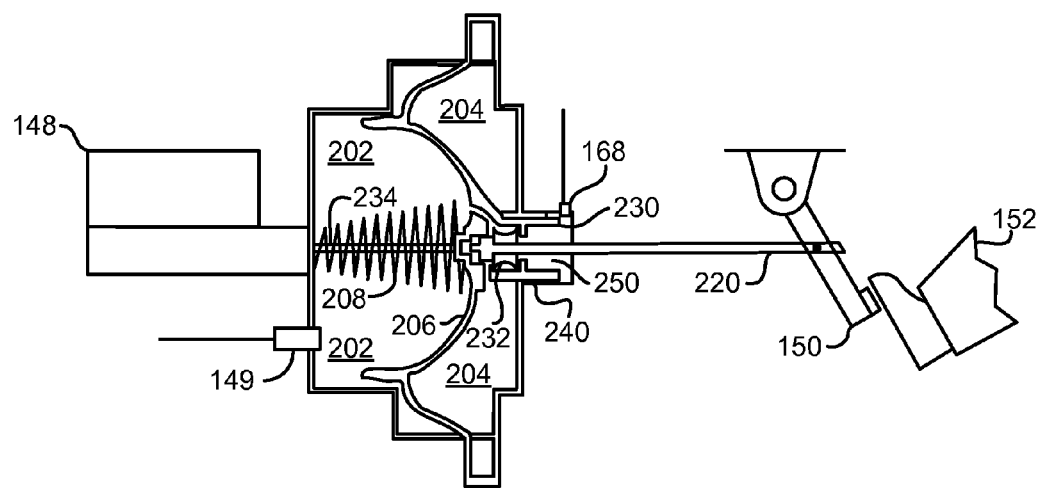
FIG. 2 shows a cross-sectional view of an example brake booster before brakes are applied by a operator.
Figure 3:
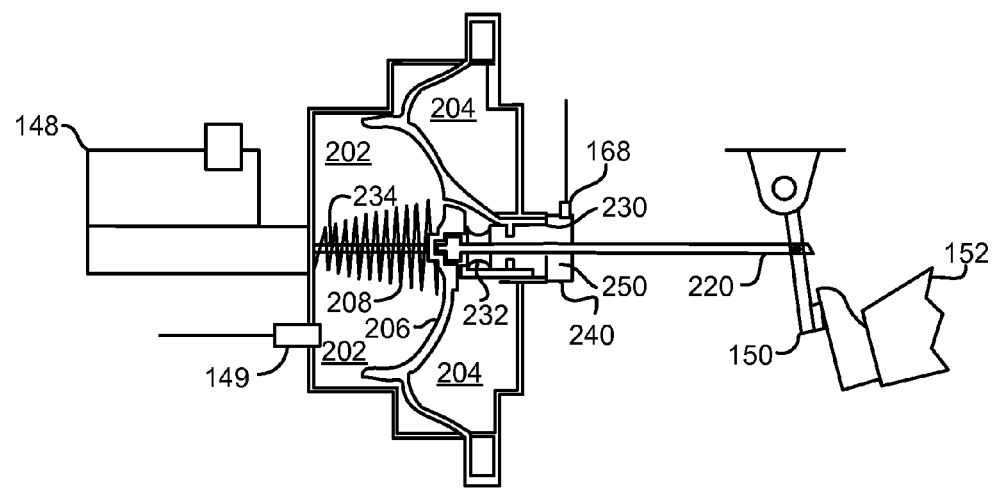
FIG. 3 shows a cross-sectional view of an example brake booster during brake application by a operator.

The present description is related to controlling and applying a source of power to assist an operator applying brakes of a vehicle. In one example, a positive air pressure is applied to a brake booster system as is described in FIG. 1. FIGS. 2 and 3 show example cross sections of a brake booster before and during brake application. In one example, brake booster pressure may be controlled according to the method of FIG. 5.

Figure 1:
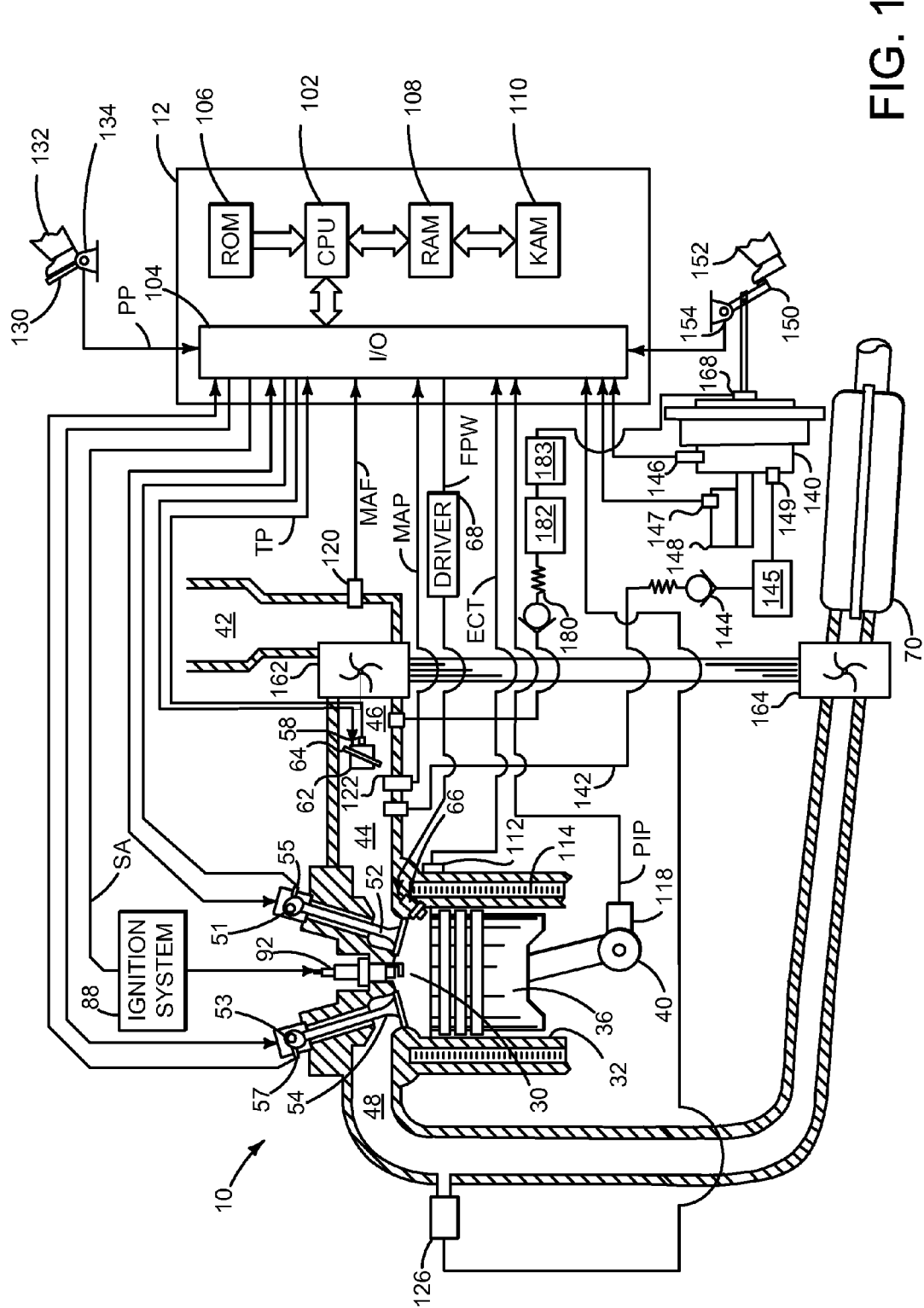
FIG. 1 shows a schematic depiction of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from operator 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162. A high pressure, dual stage, fuel system may be used to generate higher fuel pressures at injectors 66. Intake manifold 44 also provides vacuum to brake booster 140 via conduit 142, vacuum reservoir 145, and vacuum port 149. Check valve 144 ensures air flows from vacuum reservoir 145 to intake manifold 44 and not from intake manifold 44 to vacuum reservoir 145. In some examples, vacuum reservoir 145 may be omitted. Brake booster 140 amplifies force provided by operator 152 via brake pedal 150 to master cylinder 148 for applying vehicle brakes (not shown). Positively pressurized air, relative to ambient atmospheric air pressure, may also be applied to brake booster 140 via conduit 46. In particular, pressurized air passes check valve 180 and enters boost reservoir 182 where it may be stored for later use. However, if boost is not made for a period of time boost reservoir 182 may be exposed to vacuum from vacuum reservoir 145. When boost reservoir 182 is exposed to vacuum, condensed water vapor in boost reservoir 182 can be drawn into the engine. In one example, controller 12 may include valves and strategy to periodically expose boost reservoir 182 to vacuum to evacuate condensed water vapor. Pressure regulator 183 regulates the pressure of air that exits boost reservoir 182 and enters brake booster 140 via brake booster pressure port 168. In one example, pressure regulator 183 regulates the pressure of air exiting boost reservoir 182 to a predetermined pressure (e.g., the regulated pressure is limited by the source pressure). Thus, even if the boost pressure exceeds the predetermined pressure, the pressure applied to the brake booster diaphragm can be controlled so that brake application force from one brake event to another brake event is more consistent.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position, a pressure sensor 146 for sensing brake booster vacuum; a pressure sensor 147 for sensing master cylinder pressure (e.g., hydraulic brake pressure); a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Figure 4:
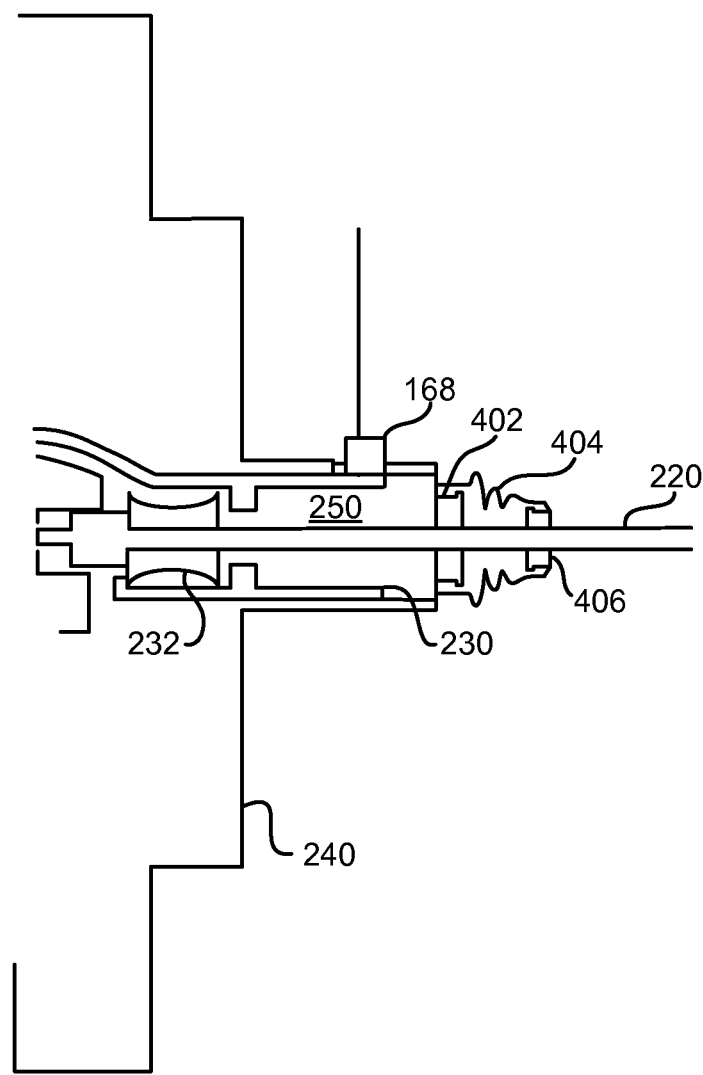
FIG. 4 shows a cross-sectional view of an example brake booster seal.

FIGS. 2, 3, and 4 depict different operating states and components of example brake boosters. It will be appreciated that like referenced characters designate identical or corresponding components and units throughout the several examples.

Referring now to FIG. 2, a cross-sectional view of an example brake booster before brakes are applied by a operator is shown. Diaphragm 206 partitions and isolates brake booster 140 in to a first chamber 204 and a second chamber 202. Spring 208 biases diaphragm 206 toward the first chamber 204 when no operator brake application is present. Vacuum enters brake booster 140 via vacuum port 149, and vacuum may be produced via an engine or vacuum pump. Actuator rod 220 is shown coupled to brake pedal 150 and operates a valve 232 that controls air flow between first chamber 204 and second chamber 202. Pressurized air can enter brake booster 140 via pressure port 168. Sleeve 230 guides movement of diaphragm 206 and moves within sealed housing 240. Master cylinder control rod 234 transfers force applied to diaphragm 206 to master cylinder 148. Master cylinder 148 translates mechanical force from master cylinder control rod 234 to hydraulic pressure for actuating vehicle brakes.

When brake pedal 150 is not pressed by operator 152, valve 232 allows vacuum in second chamber 202 and first chamber 204 of brake booster 140. In particular, valve 232 puts second chamber 202 in fluid communication with first chamber 204 and isolates third chamber 250 from second chamber 202 and first chamber 204. Thus, pressures within second chamber 202 and first chamber 204 equilibrate, and pressure in third chamber 250 goes to a pressure less than or equal to a predetermined pressure as determined by a regulator such as pressure regulator 183 of FIG. 1. By providing vacuum in second chamber 202 and first chamber 204 when brake pedal 150 is not pressed, forces produced via air pressure on diaphragm 206 are balanced so that spring 208 can return diaphragm 206, sleeve 230, and actuator rod 220 to a base brake booster actuator state.

Referring now to FIG. 3, a cross-sectional view of an example brake booster during application of brakes by an operator is shown. The elements of FIG. 3 that have the same numerical identifiers as the elements of FIG. 2 operate the same as the elements described in FIG. 2. Accordingly, for the sake of brevity, the description of elements already described in FIG. 2 is omitted, but the elements of FIG. 3 having the same numerical identifiers as the elements in FIG. 2 are to be understood to be the same in structure and operation.

FIG. 3 shows operator 152 applying vehicle brakes via brake pedal 150. Applying brake pedal 150 moves actuator rod 220 causing valve 232 to isolate second chamber 202 from first chamber 204. For example, second chamber 202 and first chamber 204 are not in fluid communication. Further, valve 232 opens and allows fluid communication between third chamber 250 and first chamber 204. By isolating second chamber 202 from first chamber 204, different pressures can develop in second chamber 202 and first chamber 204. In addition, valve 232 allows pressurized air to flow from pressure port 168 into third chamber 250 and onto first chamber 204. In this way, air in first chamber is pressurized and a vacuum remains in second chamber 202. The volume of second chamber 202 is reduced when the differential pressure between second chamber 202 and first chamber 204 causes spring 208 to compress and diaphragm 206 to deflect in the direction of second chamber 202. As diaphragm 206 moves toward second chamber 202 it moves master cylinder control rod 234 toward master cylinder 148. As a result, master cylinder 148 increases hydraulic pressure to vehicle brakes to thereby apply vehicle brakes.

Brakes begin to be released when operator 152 allows brake pedal 150 to move in a direction toward operator 152. Spring 208 moves actuator rod 220 and it travels toward operator 152 when brake pedal 150 is released causing valve 232 to isolate third chamber 250 from first chamber 204 (e.g., third chamber and first chamber are not in fluid communication). Valve 232 also begins to allow fluid communication between second chamber 202 and first chamber 204 when brake pedal 150 starts returning to a base position. The higher pressure air from first chamber 204 moves from first chamber 204 in the direction of lower pressure air to second chamber 202 before moving to a vacuum reservoir (not shown) and then on to the engine intake manifold. First chamber 204 and second chamber 202 equilibrate to the same pressure until brake pedal 150 is depressed by operator 152.

It should be noted that in other examples pressure in first chamber 204 can be released to atmosphere rather than into second chamber 202. Alternatively, pressure in first chamber 204 can be released to atmosphere until pressure in first chamber substantially reaches atmospheric pressure and then atmospheric pressure from first chamber 204 may be evacuated to second chamber 202.

Sealed housing 240 allows actuator rod 220 to move back and forth while maintaining pressurized air. In one example, sealed housing 240 may include a boot type seal as shown in FIG. 4. In other examples, actuator rod 220 may control a valve that allows pressurized air to flow from a pressurized air reservoir to first chamber 204. Thus, a seal between actuator rod 220 and atmospheric pressure is not needed in some examples.

Referring now to FIG. 4, a cross-sectional view of an example brake booster seal is shown. Pressurized air enters sealed housing 240 via pressure port 168. Air pressure in third chamber 250 is maintained via sleeve 230 and boot 404. Boot 404 may be made of rubber or of other pliable material. Boot 404 is coupled to first boot retainer 402 and second boot retainer 406. First boot retainer 402 is shown coupled to sealed housing 240 while second boot retainer 406 is shown coupled to actuator rod 220. Boot retainer 406 moves with actuator rod 220 when actuator rod 220 moves in response to brake application and release. Thus, in this example, boot is anchored to first boot retainer 402 and second boot retainer 406, thereby providing a seal between actuator rod 220 and sealed housing 240. A seal interior to sealed housing 240 is provided by sleeve 230 and valve 232.

Thus, the system of FIGS. 1-4 provides for 15 a system for improving brake operation, comprising: an engine having a compressor; a brake booster; and a first conduit configured to supply positively pressurized air from a location in an air intake system of the engine downstream of the compressor to the brake booster. The system further comprises an intake manifold of the engine located in the air intake system at a location downstream of the compressor, the system further comprising a second conduit configured to supply vacuum to the brake booster. The system further comprises a pressure reservoir for storing the positively pressurized air and a regulator for controlling a pressure of the positively pressurized air. The system further comprises a controller, the controller including instructions for controlling an output of the regulator to a predetermined pressure. The system further comprises additional instructions for varying the predetermined pressure as atmospheric pressure varies. The system further comprises additional instructions for controlling an output pressure of the compressor in response to a pressure of the pressure reservoir.

Figure 5:
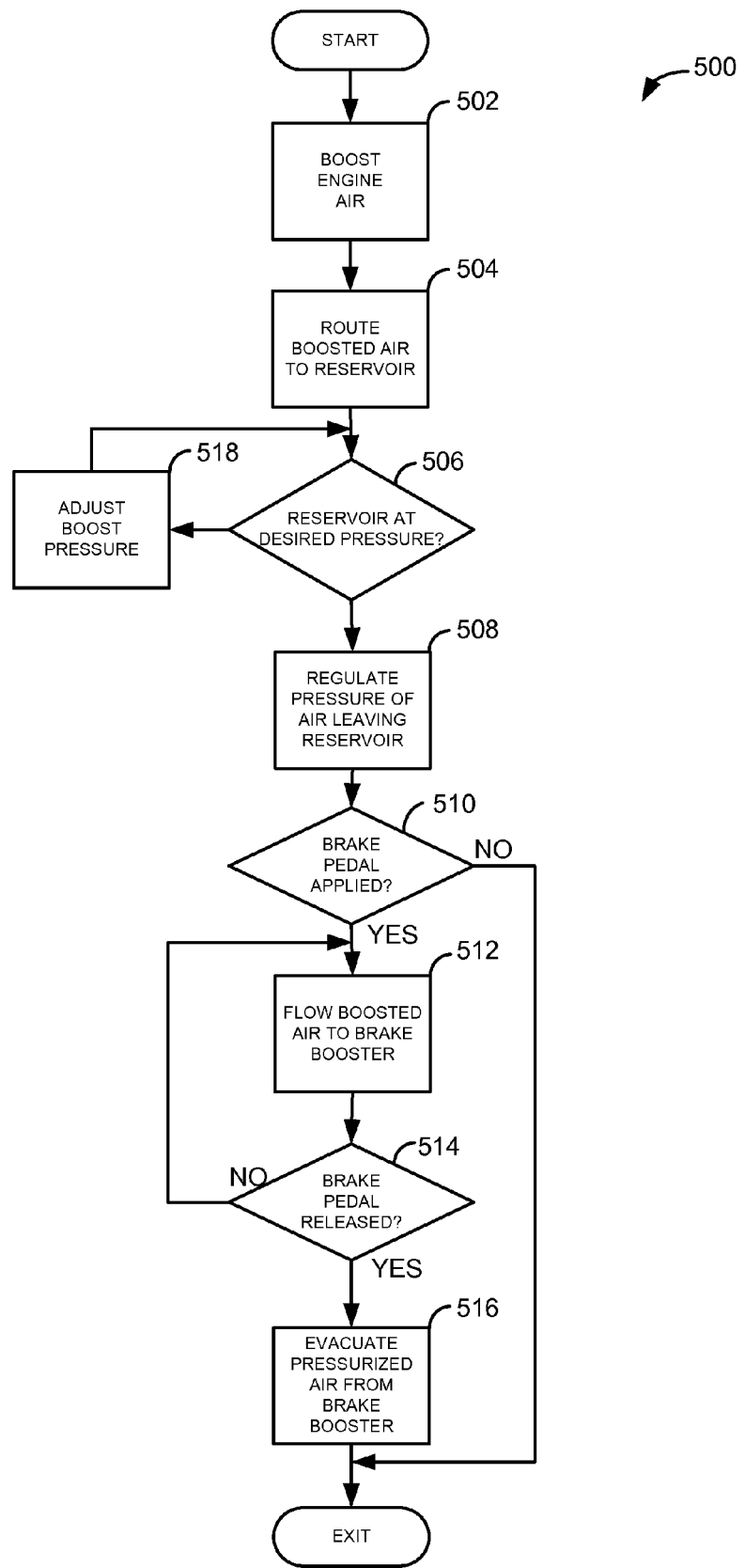
FIG. 5 shows an example flowchart for controlling air applied to a brake booster is shown.

Referring now to FIG. 5, a method for controlling air applied to a brake booster is shown. The method of FIG. 5 is executable via instructions by a controller such as controller 12 shown in FIG. 1.

At 502, method 500 boosts air to a pressure above atmospheric pressure. Air pressure may be boosted by an engine exhaust driven turbocharger or by a mechanically driven supercharger (e.g., crankshaft or camshaft driven compressor). Alternatively, air may be pressurized via an electrical pump uncoupled from an engine or via a mechanical pump coupled to the engine. In examples where turbochargers or superchargers provide boosted air, the air may be taken from a location in the engine air intake system upstream or downstream of an engine throttle. In examples where air is boosted by an electrical pump, air may be drawn from atmosphere. Method 500 proceeds to 504 after air is boosted to a pressure higher than atmospheric pressure.

It should also be noted that during some engine operating conditions, shortly after engine start and when a low engine torque demand is present for example, air at a pressure equal to atmospheric pressure may be used to assist in the actuation of brakes. Thus, in the present method and in the system of FIG. 1, brake application assistance may be provided during some conditions with air pressure greater than atmospheric pressure while during other conditions brake application assistance may be provided with air at atmospheric pressure.

At 504, boosted air is routed to a pressure reservoir. Pressurized air may be directed to and stored in the pressure reservoir after being compressed by a compressor so that pressurized air may be provided to the brake booster when pressurized air is not otherwise available from the compressor. For example, if an engine is operating at a low torque demand condition, the compressor output of a turbocharger may be at or near atmospheric pressure. Accordingly, air that was previously pumped to a pressure reservoir from the compressor may be directed to the brake booster under such conditions so that an expected level of brake assistance is provided to the assist the operator. Method 500 proceeds to 506 after boosted air is directed to a reservoir. It should be noted that a pressure reservoir is not required for all example systems.

At 506, method 500 regulates pressure of air leaving the pressure reservoir. In one example, the pressure of air leaving the pressure reservoir may be regulated with a mechanical regulator so that air that exits the pressure reservoir and flows to the brake booster at or less than a predetermined pressure. Thus, the pressure of air leaving the pressure reservoir can be regulated so that air at a pressure higher than the predetermined pressure does not reach the brake booster. In this way, it is possible to limit the amount of force assisting the operator to actuate the vehicle brakes so that the brakes can be applied at an expected rate. In another example, pressure of air exiting the pressure reservoir may be controlled as an absolute pressure so that the pressure of air routed to the brake booster is not altered due to changes in altitude. In still another example, the pressure of air routed to the brake booster can be regulated to provide a substantially constant pressure differential between pressure in a third chamber of a brake booster (e.g. 250 of FIG. 1) and a pressure in a vacuum reservoir (e.g., 145 of FIG. 1) or a pressure in the second chamber of the brake booster (e.g., 202 of FIG. 1). For example, if it is desired to have a pressure differential of 0.7 bar between second chamber and third chamber, the pressure of air exiting the pressure reservoir can be regulated to 1.3 bar when pressure in the vacuum reservoir is 0.6 bar. Of course, if operating conditions limit the capability of the system to reach a desired differential pressure because pressure in the pressure reservoir is less than necessary to achieve the desired differential pressure, the differential pressure is controlled to the nearest available differential pressure. For example, if a desired differential pressure is 0.7 bar, pressure in the vacuum reservoir is 0.7 bar, and pressure in the pressure is 1.3 bar, a differential pressure of 0.6 bar is provided. Method 500 proceeds to 508 after pressure of air leaving the pressure reservoir is regulated.

At 508, method 500 judges whether or not a vehicle brake pedal is applied. If so, method 500 proceeds to 510. Otherwise, method 500 proceeds to exit.

At 510, boosted air flows to a brake booster. In one example, boosted air flows to a first chamber of a brake booster. The flow of boosted air may be controlled by a position of a valve, and the position of the valve may be determined by an operator's depression of a brake pedal. In particular, the valve opening increases as the operator depresses the brake pedal an increasing distance. The pressure in the first chamber increases proportionally with the distance that the brake pedal is depressed. In other examples, the flow of boosted air may be regulated by a computer controlled valve that opens in proportion to a duty cycle of a signal applied to the computer controlled valve. Method 500 proceeds to 512 after air begins to flow from the pressure reservoir to the brake booster.

At 512, method 500 judges whether or not the operator is beginning to release the brake pedal. If the operator begins to release the brake pedal, method 500 proceeds to 514. Otherwise, method 500 returns to 510.

At 514, method 500 begins to evacuate pressurized air from the brake booster. In one example, when the distance the brake pedal is depressed decreases, a valve in communication with a brake actuator rod begins to open and starts to allow fluid communication between the second brake booster chamber and the first brake booster chamber. As such, the air pressure in the second chamber and the first chamber begins to equilibrate. The second chamber is in fluid communication with a brake booster vacuum reservoir and the brake booster vacuum reservoir is in fluid communication with an intake manifold of the engine. If the intake manifold pressure is lower than the pressure in the vacuum reservoir, air flows from the vacuum reservoir to the engine intake manifold. Otherwise, air does not flow from the vacuum reservoir to the engine intake manifold. Thus, if the brake pedal is released and intake manifold pressure is higher than vacuum reservoir pressure, pressure in the vacuum reservoir increases in response to air being released from the first chamber to the second chamber. When intake manifold pressure decreases below vacuum reservoir pressure, the air in the vacuum reservoir flows to the engine intake manifold. In this way, pressure between the first and second brake booster chambers is equilibrated so that the brake booster can return to a base position.

In this way, positively pressurized air with respect to atmospheric pressure may be applied to one side of a brake booster diaphragm while a vacuum with respect to atmospheric pressure may be applied to the other side of the brake booster diaphragm to actuate vehicle brakes. The brakes may be released by evacuating the positively pressurized air from one side of the diaphragm to the other side of the diaphragm and then into the engine for use during combustion of an air-fuel mixture. The present method may increases the force available to actuate vehicle brakes as compared to systems that rely on engine vacuum and atmospheric pressure to assist in brake actuation.

The method of FIG. 5 provides for improving brake operation of a vehicle, comprising: generating a positive pressurized air referenced to atmospheric pressure; applying the positive pressurized air to a first chamber of a brake booster; and actuating a vehicle brake via a brake booster diaphragm, the brake booster diaphragm exposed to the first chamber. The method includes where the positive pressurized air is generated via a compressor, and further comprising generating a vacuum referenced to atmospheric pressure and applying the vacuum to a second chamber of the brake booster. The method includes where the vacuum is generated via an engine. The method includes where the positive pressurized air is regulated to a predetermined pressure via a pressure regulator. The method further comprises evacuating the positive pressurized air from the first chamber of the brake booster to an engine in response to releasing a brake pedal. The method includes where the predetermined pressure varies with altitude. The method includes where the second chamber and the first chamber are partitioned by a brake booster diaphragm, and where the brake booster diaphragm is in communication with a hydraulic master cylinder.

The method of FIG. 5 also provides for improving brake operation of a vehicle, comprising: operating an engine having a compressor; generating positively pressurized air relative to atmospheric pressure via the compressor; and applying at least a portion of the positively pressurized air to a first chamber of a brake boost actuator. The method includes where the compressor is driven by a turbine of a turbocharger. The method of includes where the compressor is driven by a crankshaft or camshaft of the engine. The method further comprises generating a vacuum relative to atmospheric pressure within an intake manifold of the engine, and applying the vacuum to a second chamber of the brake boost actuator. The method includes where the positively pressurized air is held within the brake booster actuator via a flexible seal. The method includes where the positively pressurized air is stored in a pressure reservoir after exiting the compressor and before entering the brake booster actuator. The method includes where the positively pressurized air is removed from an air intake system of the engine at a location upstream of a throttle, and where the positively pressurized air is returned to the air intake system at a location downstream of the throttle.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for improving brake operation of a vehicle, comprising:
    generating an absolute positive air pressure referenced to atmospheric pressure that is not altered due to changes in altitude;
    applying the absolute positive air pressure to a first chamber of a brake booster;
    actuating a vehicle brake via a brake booster diaphragm, the brake booster diaphragm exposed to the first chamber;
    evacuating the first chamber to atmosphere until pressure in the first chamber reaches atmospheric pressure in response to releasing a brake pedal; and
    evacuating the first chamber to a second chamber of the brake booster in response to pressure in the first chamber reaching atmospheric pressure.

2. The method of claim 1, where the absolute positive air pressure is generated via a compressor, and further comprising generating a vacuum referenced to atmospheric pressure and applying the vacuum to the second chamber of the brake booster.

3. The method of claim 2, where the vacuum is generated via an engine, and where air is supplied to the brake booster at atmospheric pressure at low engine loads.

4. The method of claim 2, where the absolute positive air pressure is regulated to a pressure via a pressure regulator.

5. The method of claim 4, where the pressure provides a constant pressure differential between the pressure regulator and a vacuum reservoir.

6. The method of claim 2, where the second chamber and the first chamber are partitioned by the brake booster diaphragm, and where the brake booster diaphragm is in communication with a hydraulic master cylinder.

7. The method of claim 1, where the brake pedal is released by an operator.

8. A method for improving brake operation of a vehicle, comprising:
    operating an engine having a turbocharger;
    regulating air output from the turbocharger to a positive pressure relative to atmospheric pressure via the turbocharger at higher engine loads; and
    applying at least a portion of the air to a first chamber of a brake boost actuator at lower engine loads when turbocharger output is at atmospheric pressure, where the at least a portion of the air is routed to a boost reservoir, and where the boost reservoir is periodically exposed to vacuum.

9. The method of claim 8, where the air output from the turbocharger is regulated to an absolute positive air pressure that is not altered due to changes in altitude.

10. The method of claim 8, further comprising evacuating the first chamber of the brake boost actuator to atmosphere until pressure in the first chamber of the brake boost actuator reaches atmospheric pressure in response to releasing a brake pedal; and evacuating the first chamber of the brake boost actuator to a second chamber of the brake boost actuator in response to pressure in the first chamber reaching atmospheric pressure.

11. The method of claim 8, further comprising generating a vacuum relative to atmospheric pressure within an intake manifold of the engine, and applying the vacuum to a second chamber of the brake boost actuator.

12. The method of claim 8, where the air output from the turbocharger is held within the brake boost actuator via a flexible seal.

13. The method of claim 8, where the air output from the turbocharger is stored in a boost reservoir after exiting the turbocharger and before entering the brake boost actuator.

14. The method of claim 8, where the air output from the turbocharger is removed from an air intake system of the engine at a location upstream of a throttle, and where the air is returned to an air intake system at a location downstream of the throttle.

15. A system for improving brake operation, comprising:
    an engine having a turbocharger;
    a brake booster;
    a boost reservoir;
    a first conduit configured to supply positively pressurized air from a boost chamber located upstream of a throttle to the brake booster; and
    a controller including instructions for controlling an output of a regulator to provide an absolute positive air pressure referenced to atmospheric pressure that is not altered due to changes in altitude.

16. The system of claim 15, further comprising an intake manifold of the engine located in an air intake system at a location downstream of the turbocharger, the system further comprising a second conduit configured to supply vacuum to the brake booster.

17. The system of claim 15, where the boost reservoir stores the positively pressurized air and where the regulator controls a pressure of the positively pressurized air.

18. The system of claim 17, further comprising additional controller instructions for evacuatinig the positively pressurized air from the brake booster.

19. The system of claim 15, further comprising additional instructions for exposing the boost reservoir to vacuum.

20. The system of claim 15, further comprising additional instructions for supplying air to the brake booster at atmospheric pressure at low engine loads.

* * * * *